(12) United States Patent  (10) Patent No.: US 7,544,005 B2
Senba et al.  (45) Date of Patent: Jun. 9, 2009

(54) DEVICE FOR PHOTOGRAPHING WITH LENS BARREL

(75) Inventors: Takehiko Senba, Saitama (JP); Seimei Ushiro, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 436 days.

(21) Appl. No.: 11/542,262

(22) Filed: Oct. 4, 2006

(65) Prior Publication Data

US 2007/0077062 A1  Apr. 5, 2007

(30) Foreign Application Priority Data

Oct. 4, 2005  (JP)  ............................. 2005-291473

(51) Int. Cl.
*G03B 17/00* (2006.01)
(52) U.S. Cl. ...................... 396/529; 396/535
(58) Field of Classification Search ................ 396/342, 396/347, 529–532, 535, 540; 348/373–376; 359/819, 827–830
See application file for complete search history.

(56) References Cited

U.S. PATENT DOCUMENTS 6,118,485 A * 9/2000 Hinoue et al. ............... 348/373

6,167,208 A   12/2000 Sato
6,490,419 B2  12/2002 Teramoto

FOREIGN PATENT DOCUMENTS

| JP | 11-142935 A | 5/1999 |
| JP | 2000-106640 A | 4/2000 |
| JP | 2001-125187 A | 11/2001 |
| JP | 2002-055388 A | 2/2002 |

* cited by examiner

*Primary Examiner*—Christopher E Mahoney
*Assistant Examiner*—Minh Phan
(74) *Attorney, Agent, or Firm*—Sughrue Mion, PLLC

(57) ABSTRACT

A digital still camera includes a camera main unit and a lens barrel fitted thereon in a removable manner. First electric contacts in a group are disposed on the camera main unit. Second electric contacts in a group are disposed on the lens barrel, for electric contact with the first electric contacts upon mounting of the lens barrel on the camera main unit, and for communication between those. The camera main unit includes a connector, having the first electric contacts, and coupled with a camera front face in an openable manner. The lens barrel includes a cavity, having the second electric contacts, for receiving insertion of the connector opened in a forward direction. The first electric contacts are disposed on a rear surface positioned internally when the connector is closed. Furthermore, a retaining mechanism retains the connector being inserted in the cavity.

17 Claims, 11 Drawing Sheets

DEVICE FOR PHOTOGRAPHING WITH LENS BARREL

BACKGROUND OF THE INVENTION

1. Field of the Invention

The present invention relates to a device for photographing with a lens barrel. More particularly, the present invention relates to a device for photographing with a lens barrel, having the lens barrel removable from a camera main unit, and in which contacts for electrical connection between the camera main unit and the lens barrel can be handled easily.

2. Description Related to the Prior Art

A camera known in the art is constituted by a camera main unit and a lens barrel secured to the camera main unit removably, which is typical in such a type as a SLR (single lens reflex) camera, or digital still camera. In order to transmit and receive electric signals between the lens barrel and the camera main unit, electric contacts are used. Examples of documents related to this are U.S. Pat. No. 6,167,208 (corresponding to JP-A 11-142935), U.S. Pat. No. 6,490,419 (corresponding to JP-A 2002-055388), JP-A 2000-106640 and JP-A 2001-125187. The camera main unit sends a lens driving signal to the lens barrel through the contacts. If an image pickup element is incorporated in the lens barrel, the lens barrel sends an image signal to the camera main unit.

There is a problem in the known structures of the lens barrel and the camera main unit. When the lens barrel is separated from the lens barrel, the contacts of those appear externally, and are likely to be broken because of lack of the protected state. Also, the contacts, when positioned to appear externally, are not acceptable in consideration of the design of appearance of the camera.

SUMMARY OF THE INVENTION

In view of the foregoing problems, an object of the present invention is to provide a device for photographing with a lens barrel, having the lens barrel removable from a camera main unit, and in which contacts for electrical connection between the camera main unit and the lens barrel can be handled easily.

In order to achieve the above and other objects and advantages of this invention, a device for photographing includes a camera main unit. A lens barrel is secured to said camera main unit in a removable manner. A first electric contact is disposed on said camera main unit. A second electric contact is disposed on said lens barrel, for electric contact with said first electric contact upon mounting of said lens barrel on said camera main unit, and for communication between said camera main unit and said lens barrel. A connector is disposed in said camera main unit, and coupled with a camera front face in an openable manner, wherein said first electric contact is disposed on a rear surface positioned internally when said connector is closed. A cavity is formed in said lens barrel, having said second electric contact, for receiving insertion of said connector opened in a forward direction.

Furthermore, a retaining mechanism retains the connector being inserted in the cavity.

The camera main body includes a hinge mechanism for keeping the connector rotatable on the camera front surface between open and closed positions.

The cavity includes an entrance channel. A lid is shiftable between first and second positions, for closing the entrance channel when in the first position, and for being pushed by the connector being inserted, to shift to the second position to open the entrance channel.

The camera main unit includes a power switch for switching on and off upon opening and closing of the connector, to supply the lens barrel with power.

The retaining mechanism is disposed in an inside of the entrance channel, and retains an engageable portion of the connector by pressure.

The camera front surface has a lens mount mechanism where the lens barrel is mounted, and the connector covers the lens mount mechanism when closed.

The first electric contact is plural contacts arranged in at least two arrays.

The first electric contacts are arranged in a zigzag form.

The first electric contacts are in a shape having a sharp corner, and are so disposed that the sharp corner is directed opposite between the at least two arrays.

The connector is constituted by at least first and second connectors kept rotatable in directions opposite to one another by the hinge mechanism.

The at least first and second connectors are different in a shape.

The at least first and second connectors are different in a size in a vertical direction.

The lens barrel includes a grip portion in which the cavity is formed.

The lens barrel further includes a panel part disposed to project from a barrel peripheral surface, fitted on the camera front surface, and having the grip portion projecting from a panel surface in the forward direction.

The lens barrel includes an image pickup element for producing image data by photo reception of object light.

The lens barrel includes an image data storage for storing the image data. An external data storage is used with the camera main unit, for storing the image data.

The device for photographing is a digital still camera.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
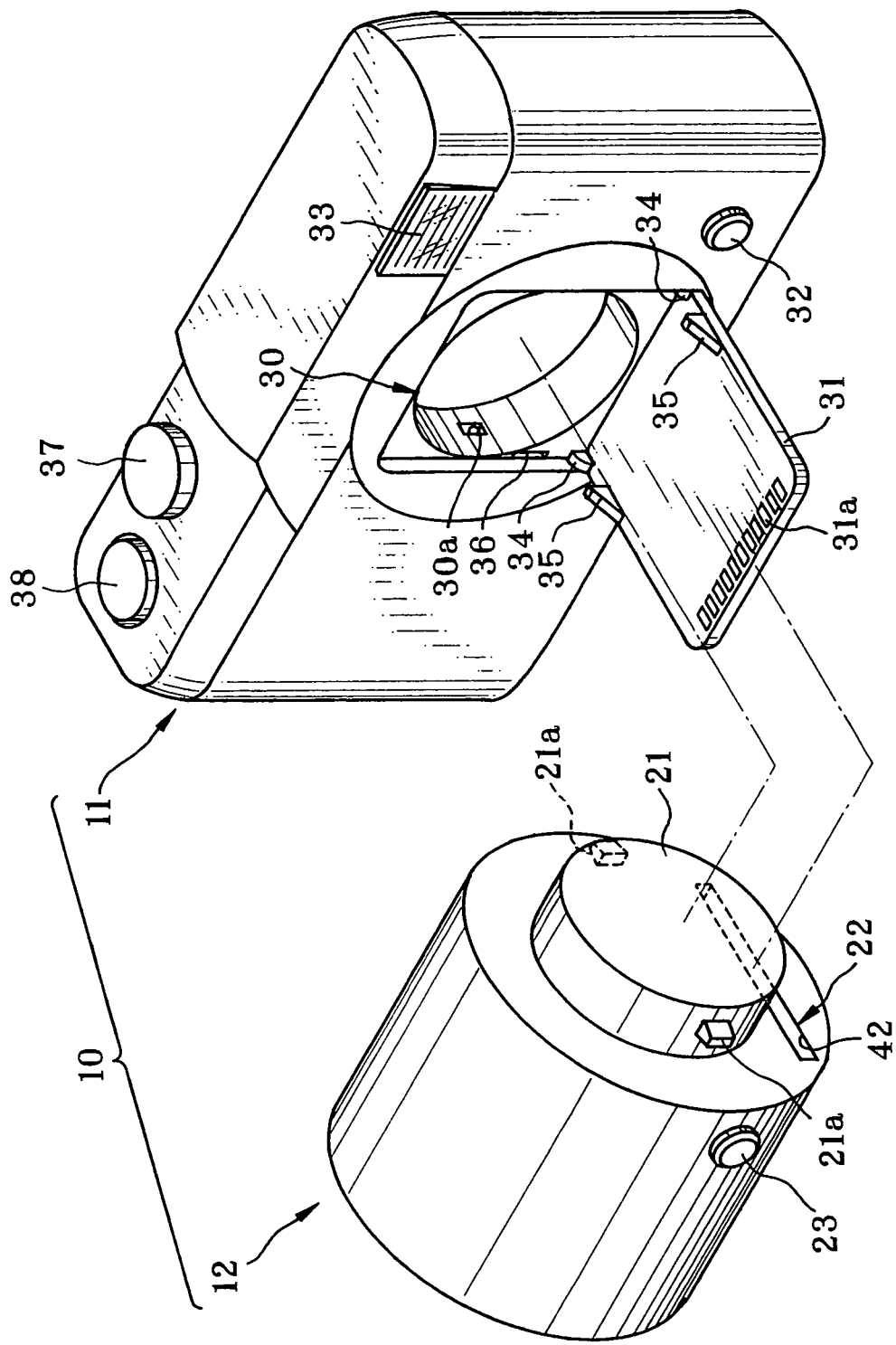
FIG. 1 is a perspective illustrating a digital still camera.
Figure 3:
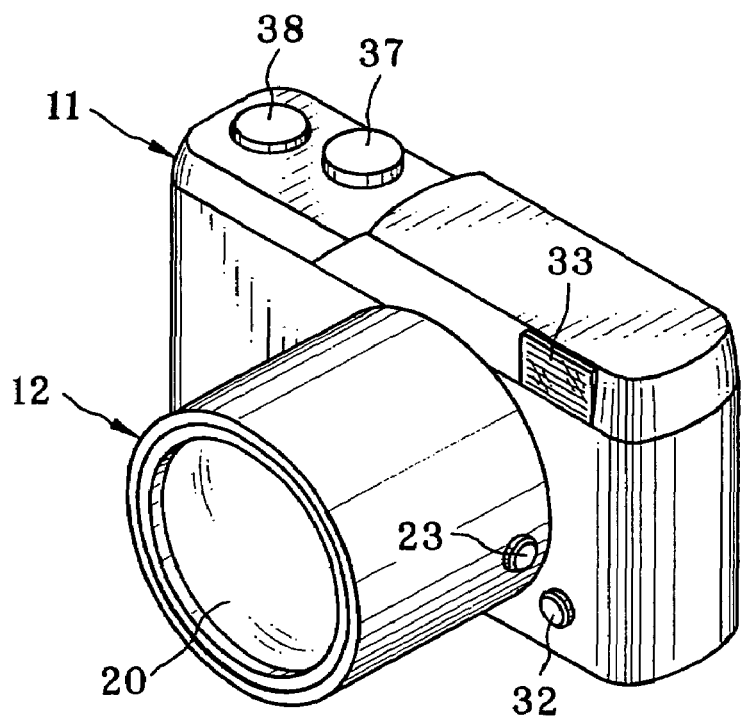
FIG. 3 is a perspective illustrating a camera main unit provided with the lens barrel.

In FIG. 1, a digital still camera 10 includes a camera body or camera main unit 11 and a lens barrel 12. The lens barrel 12 is an interchangeable lens barrel coupled with the camera main unit 11 removably. In FIG. 3, a photographing lens 20 appears in the front of the lens barrel 12. The rear of the lens barrel 12 has a connection ring 21 and a cavity for insertion 22. The connection ring 21 is connected with a lens mount mechanism 30 with a camera front surface in the camera main unit 11. A connector 31 of a door shape is included in the camera main unit 11, and is inserted in the cavity 22 with a small thickness.

The front of the camera main unit 11 has the lens mount mechanism 30, the connector 31, an open button 32, and a flash light source 33. The lens mount mechanism 30 is connectable with the connection ring 21 fitted thereon. The connector 31 has a flat panel shape, and insertable in the cavity 22. The open button 32 is depressible for opening the connector 31 from the closed state of FIG. 2 to the open state of FIG. 1. The flash light source 33 emits flash light toward an object.

Figure 2:
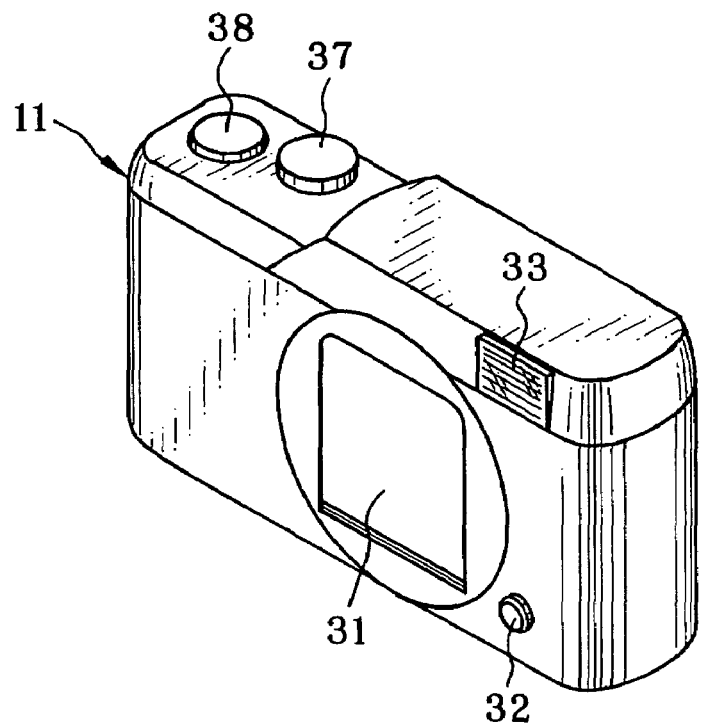
FIG. 2 is a perspective illustrating a connector in a closed state.
Figure 4A:
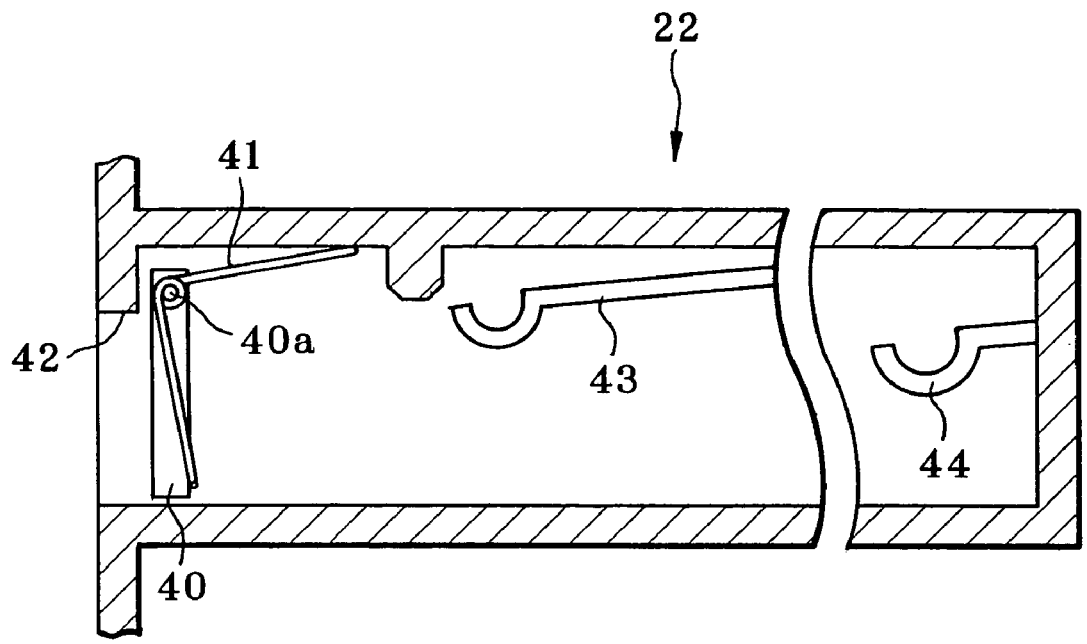
FIG. 4A is a horizontal section, partially broken illustrating a cavity.
Figure 4B:
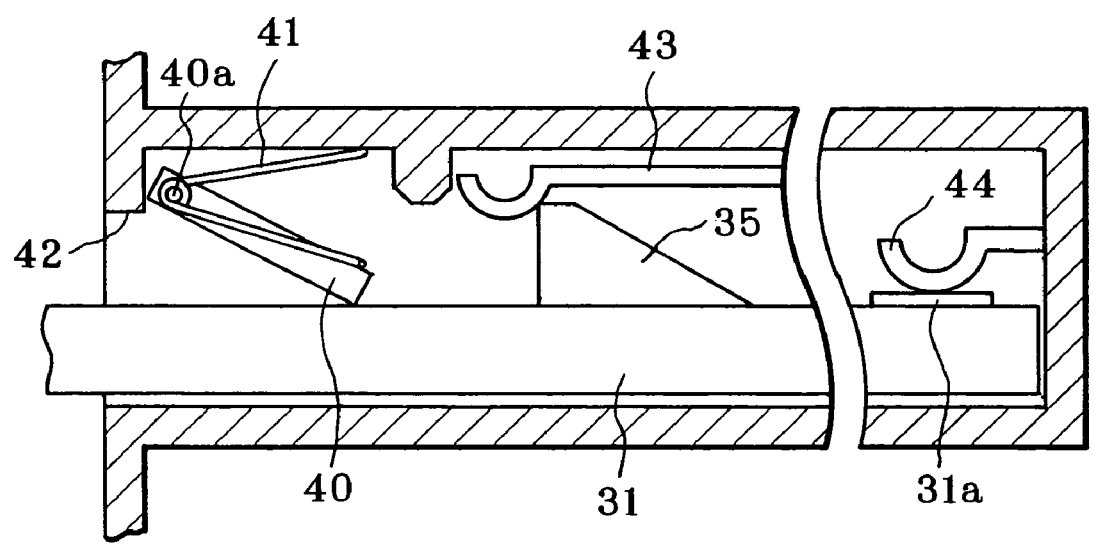
FIG. 4B is a horizontal section, partially broken illustrating the cavity in which the connector is inserted.

First electric contacts or contact group 31a is disposed in an edge portion of the rear of the connector 31 in shapes of plural strips. A hinge mechanism 34 keeps the connector 31 rotatable. The first electric contacts 31a are connected with inner circuits in the camera main unit 11 by lines extending through the hinge mechanism 34. Retaining claws 35 are disposed to project from the rear of the connector 31. A retaining spring 43 of FIGS. 4A and 4B is disposed in the cavity 22, and is engageable with the retaining claws 35. When the connector 31 is closed rotationally as illustrated in FIG. 2, the connector 31 covers the lens mount mechanism 30. The first electric contacts 31a are protected behind the lens mount mechanism 30. A recess 36, disposed near to the lens mount mechanism 30, comes to contain each of the retaining claws 35.

An engageable hole 30a is formed in the lens mount mechanism 30. A projection or spring plunger 21a of the connection ring 21 in FIG. 3 is engaged with the engageable hole 30a while the lens barrel 12 remains fitted on the camera main unit 11. A release button or ejector 23 is disposed on the side of the lens barrel 12. The spring plunger 21a becomes retracted into the connection ring 21 in response to depression of the ejector 23. The ejector 23 is depressed for ejecting the lens barrel 12 from the camera main unit 11.

A power button 37 and a shutter button 38 are disposed on an upper face of the camera main unit 11. The power button 37 is depressed for switching on and off the power supply of the camera main unit 11. An LCD display panel (not shown) is disposed on the rear for displaying an image, a menu image for a setting, or other information. A wheel or dial (not shown) is disposed on the rear, and is operable for changing over the mode between the photographing mode and playback mode.

In FIG. 4A, a lid 40 is associated with the cavity 22. A pivot 40a keeps the lid 40 rotatable thereabout. An entrance channel 42 of the cavity 22 opens externally. A torsion coil spring 41 biases the lid 40 to close the entrance channel 42. Also, the lid 40 prevents entry of dust and other foreign material in the cavity 22. Note that a magnet or other elements may be used in place of the torsion coil spring 41 for setting the lid 40 to close the entrance channel 42.

In FIG. 4B, when the connector 31 is inserted to shift the lid 40 inward from the entrance channel 42, the retaining spring 43 retains the retaining claws 35 by biasing. The retaining spring 43 has a shape of a spring, and is disposed inside the cavity 22. Also, second electric contacts or contact group 44 of spring shapes are disposed inside the cavity 22, and contacts the first electric contacts 31a in a mechanically biased manner.

When the retaining claws 35 become engaged with the retaining spring 43 by inserting the connector 31 in the cavity 22, friction is obtained by the engagement. The second electric contacts 44 are reliably caused to contact the first electric contacts 31a by the bias, so conduction in a stable manner is obtained. Thus, there are two advantages. A user can feel the ensured connection by manual touch upon the engagement. Also, electric connection of the connector 31 in the cavity 22 can be maintained firmly.

Figure 5:
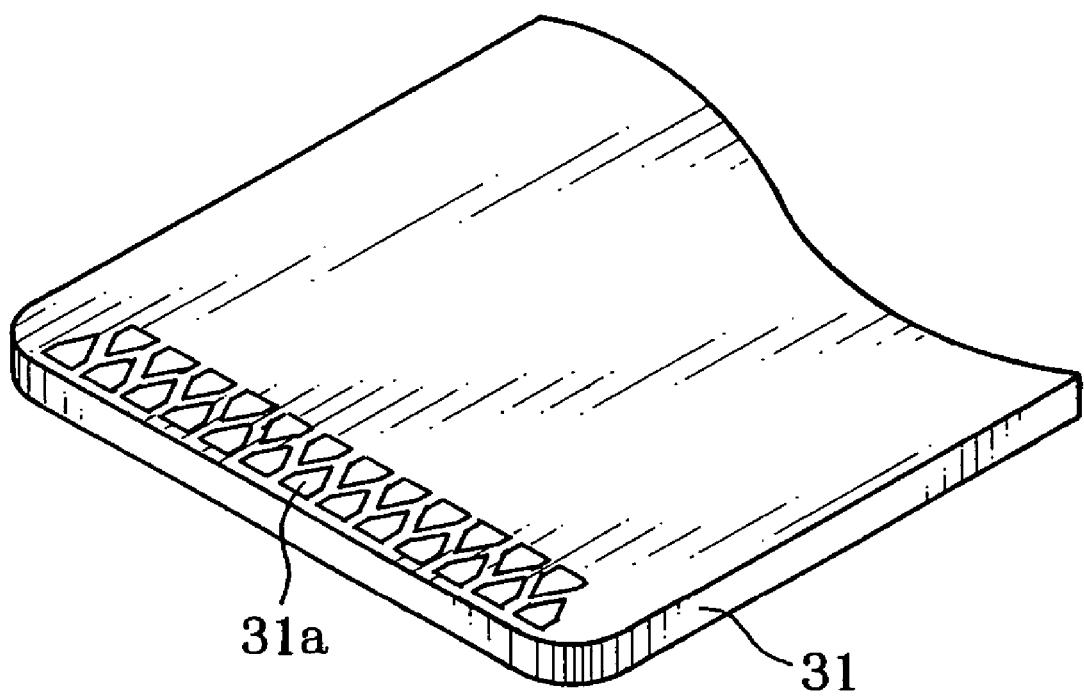
FIG. 5 is a perspective, partially broken illustrating another preferred arrangement of first electric contacts.

Each of the first electric contacts 31a is preferably in a pentagonal or triangular shape as depicted in FIG. 5. The first electric contacts 31a are arranged in two arrays and arranged alternately, namely in a zigzag manner. Portions of an acute angle or sharp corner among inner angles of the pentagonal shape are positioned alternately. This is effective in raising density of the arrangement of the first electric contacts 31a, of which the number of the contacts can be determined high.

Figure 6:
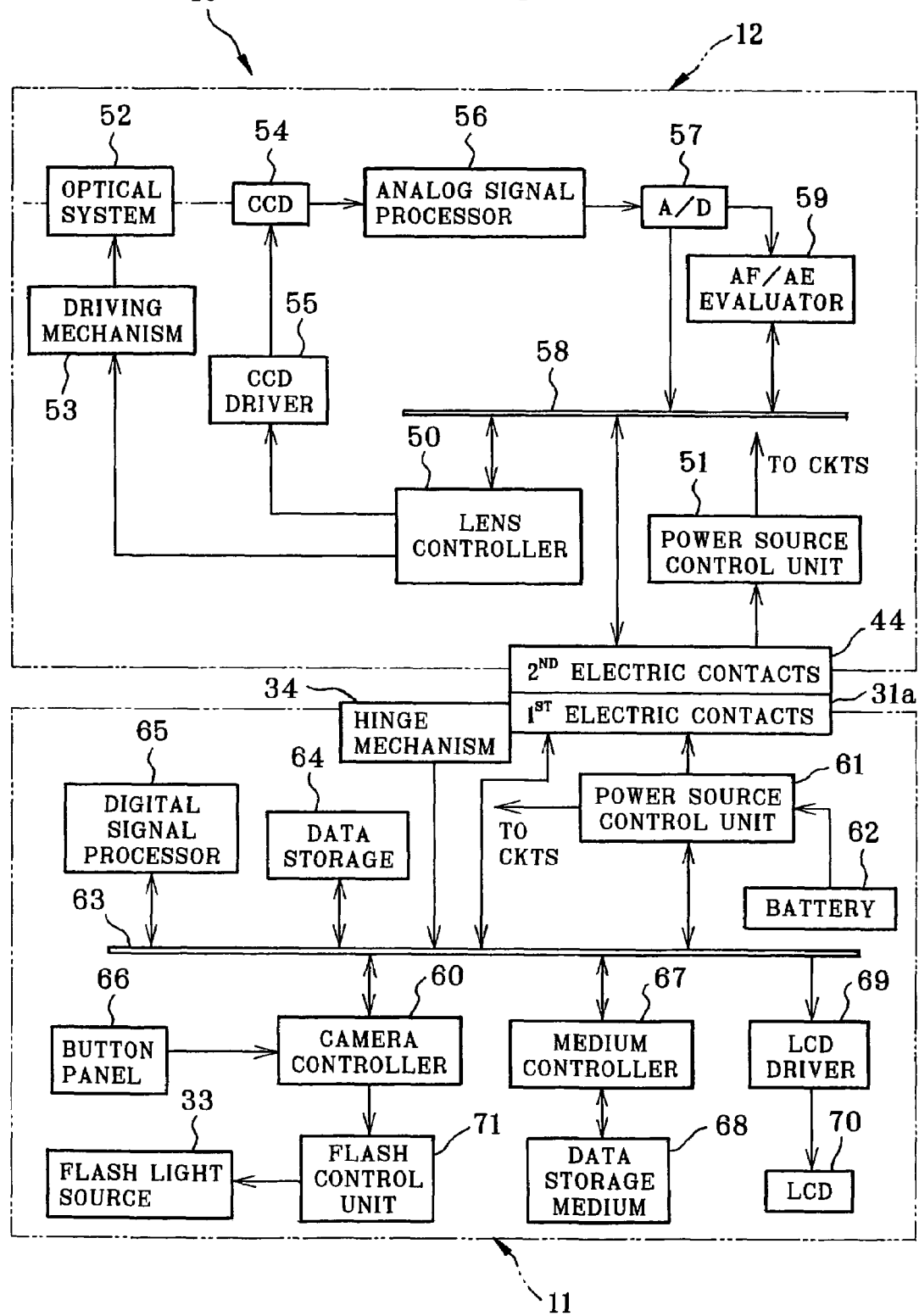
FIG. 6 is a block diagram illustrating electric arrangement of the digital still camera.

In FIG. 6, arrangement of circuits of the digital still camera 10 is illustrated. A lens controller 50 is incorporated in the lens barrel 12. A power source control unit 51 with a power source switch is supplied with power by the camera main unit 11 through the first and second electric contacts 31a and 44, and supplies various circuits in the lens barrel 12 with power. A camera controller 60 in the camera main unit 11 communicates with the lens controller 50 by use of the first and second electric contacts 31a and 44. The lens controller 50 controls the lens barrel 12 according to a controls signal generated by the camera controller 60.

An optical system 52 includes the photographing lens 20 and aperture stop mechanism. A driving mechanism 53 is associated with the optical system 52, and includes a lens motor and iris motor. The driving mechanism 53 is controlled by the lens controller 50, and adjusts the focused state, zoom magnification, aperture stop value and the like.

A CCD image sensor 54 as image pickup element is disposed on an optical axis of the optical system 52. A number of photo diodes are arranged two-dimensionally on the CCD 54. In the photographing mode, the CCD 54 photoelectrically converts object light focused by the optical system 52, and stores charge in each of photo diodes according to light amounts. A CCD driver 55 supplies a drive pulse. The charge stored in the photo diodes is read according to the drive pulse one after another as image signal or voltage signal according to the charge amount.

An image signal output by the CCD 54 is sent to an analog signal processor 56, which is constituted by a correlated double sampling (CDS) circuit, auto gain control (AGC) circuit, amplifier and the like. The analog signal processor 56 processes the image signal for elimination of electrical noise, adjustment of gain and the like. An A/D converter 57 is supplied with an output from the analog signal processor 56, and converts the signal into a digital signal.

A data bus 58 is connected with the lens controller 50. The lens controller 50 controls various elements, and causes the A/D converter 57 to output image data or image signals of image frames one frame after another. The image data is transmitted through the data bus 58, and is input to the camera main unit 11 through the first and second electric contacts 31a and 44. The CCD 54, the analog signal processor 56 and the A/D converter 57 are combined for image pickup to produce image data by detecting object light.

An AF/AE evaluator 59 is accessed by the lens controller 50, and supplied with image data output by the A/D converter 57 at the time of automatically adjusting the focus for AF, or automatically adjusting the exposure for AE. In the AF mode, the AF/AE evaluator 59 extracts component of high frequency within a predetermined range of input image data, and adds up the component for each of pixels to obtain an AF evaluation value or contrast value. In the AE mode, the AF/AE evaluator 59 extracts component of high frequency within a predetermined range of input image data, and adds up the component for each of pixels to obtain an AE evaluation value or object light amount. The AF/AE evaluator 59 sends the AF and AE evaluation values to the lens controller 50 through the data bus 58.

The lens controller 50 at the time of AF operation controls the optical system 52 to adjust the position of the focus lens in the photographing lens 20 to maximize the AF evaluation value by monitoring the peak. Also, the lens controller 50 at the time of AE operation controls the aperture stop mechanism in the optical system 52 and electronic shutter speed of the CCD 54, to optimize the AE evaluation value by use of a target value.

The camera controller 60 in the camera main unit 11 controls various elements in the camera. There is a power source control unit 61, with which a battery 62 is connected. The power source control unit 61 converts an output voltage into a predetermined voltage, and supplies various elements in the camera main unit 11 with power. Also, the power source control unit 61 supplies the lens barrel 12 with power by means of the first and second electric contacts 31a and 44. The battery 62 and the power source control unit 61 supply power to the lens barrel 12.

A data bus 63 is incorporated in the camera main unit 11. Image data input in the camera main unit 11 is written to an image data storage or storage medium 64 through the data bus 63. Data format of a data file of the image data may be CCD-RAW of raw image data. A digital signal processor 65 processes image data read from the image data storage 64 in processing of synchronization, gamma conversion, Y-C conversion, compression and the like.

A button panel 66 has the power button 37 and the shutter button 38 described above. The shutter button 38 is a switch of a two step depressible structure. When the shutter button 38 is halfway depressed in the photographing mode, a first step switch is turned on, so the lens barrel 12 operates for the AF and AE operation to stand by for image pickup. When the shutter button 38 is fully depressed, a second step switch is turned on. The digital signal processor 65 processes image data written to the image data storage 64 for the signal processing. A medium controller 67 writes the image data to an external image data storage medium 68.

In the standby state before depression of the shutter button 38 in the photographing mode, the digital signal processor 65 processes image data from the image data storage 64 by image processing in a simplified manner and Y-C processing. A display driver 69 causes an LCD display panel 70 to display a live image.

In the playback mode, the medium controller 67 reads image data from the external image data storage medium 68, and writes the same to the image data storage 64. The digital signal processor 65 processes the image data by processing of expansion. The display driver 69 causes the LCD display panel 70 to display a playback image according to the image data.

A flash control unit 71 is connected with the camera controller 60. When the shutter button 38 is depressed fully in the photographing mode, the camera controller 60 sends a command signal to the flash control unit 71 to drive the flash light source 33 for flash emission.

A detector (not shown) is associated with the hinge mechanism 34, and electrically detects an open or closed state of the connector 31. In FIG. 2, the closed state is illustrated. In FIG. 1, the open state is illustrated. A detection signal of the detector is sent to the camera controller 60 through the data bus 63. The camera controller 60 refers to the detection signal from the hinge mechanism 34, and switches on or off in control of the power source control unit 61 for switching supply of power to the lens barrel 12. This is effective in saving electric power by preventing waste of power.

Figure 7:
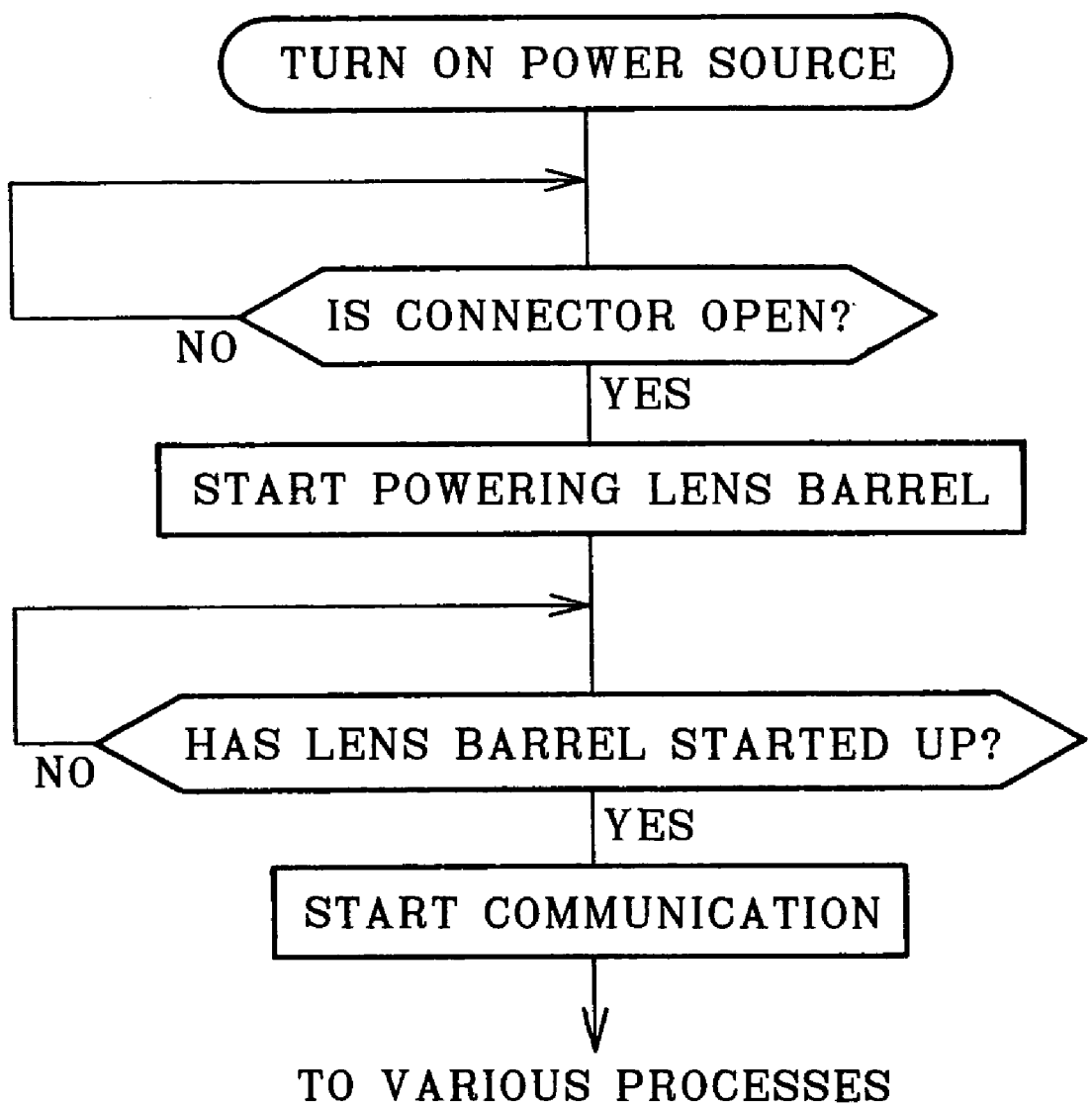
FIG. 7 is a flow chart illustrating operation of powering and start of communication in the digital still camera.

Specifically, the camera controller 60 responds to depression of the power button 37. According to a flow of FIG. 7, the camera controller 60 refers to the detection signal from the hinge mechanism 34 and discerns the open or closed state of the connector 31. Upon opening the connector 31, the camera controller 60 causes the power source control unit 61 to supply the lens barrel 12 with power. When the camera controller 60 receives a signal from the lens controller 50 to notify the startup of the lens barrel 12, then the camera controller 60 starts communication with the lens barrel 12 for operation.

Figure 8:
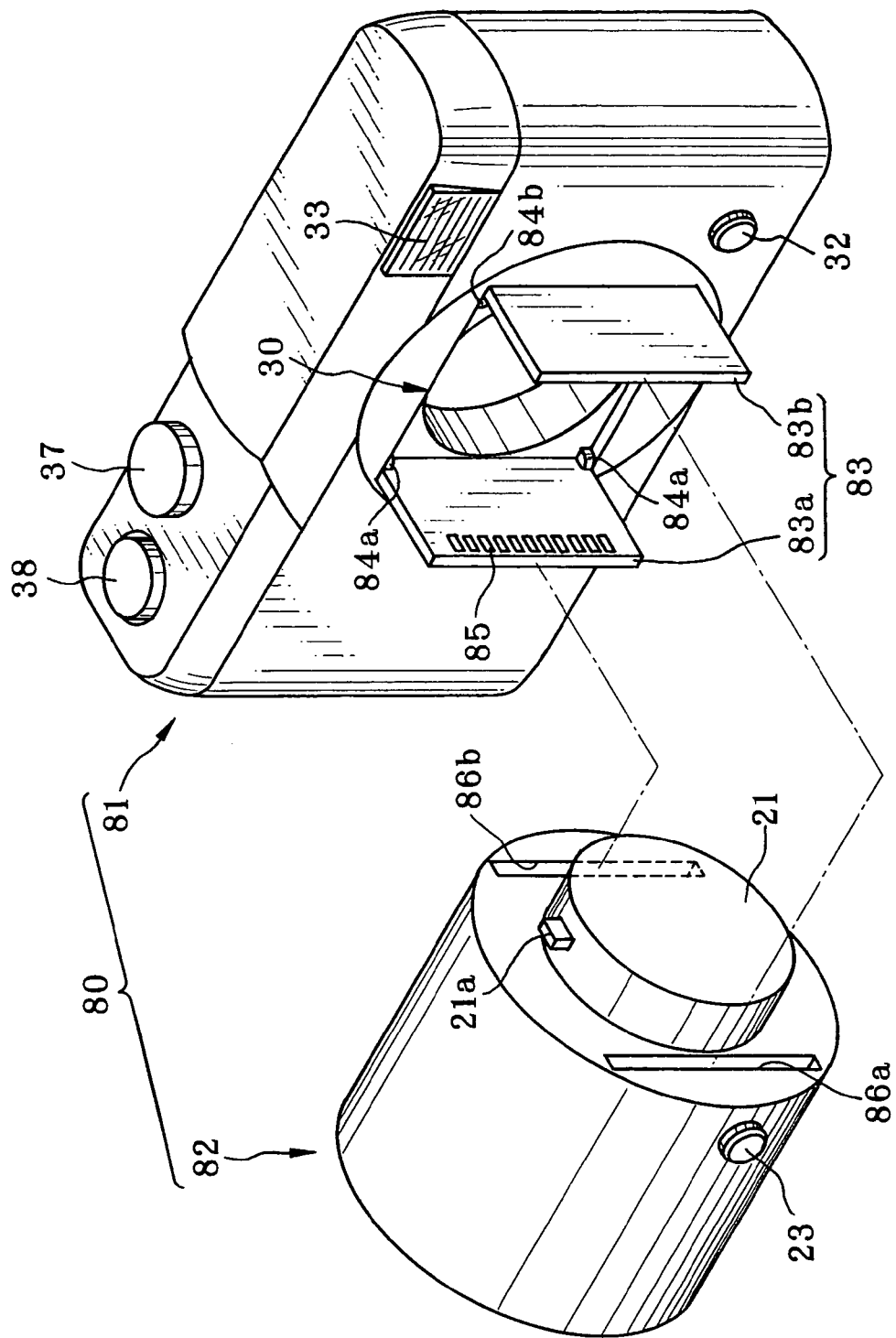
FIG. 8 is a perspective illustrating another preferred digital still camera having two door shaped connectors.

In FIG. 8, another preferred digital still camera 80 is illustrated. A lens barrel 82 is combined with a camera body or camera main unit 81 in the digital still camera 80. Elements similar to those of the above embodiment are designated with identical reference numerals.

A connector assembly 83 of a door shape includes first and second door shaped connectors 83a and 83b. Hinge mechanisms 84a and 84b keep respectively the first and second connectors 83a and 83b rotatable on the front of the camera main unit 81. The first connector 83a is disposed on a right side of the lens mount mechanism 30. The second connector 83b is disposed on a left side of the lens mount mechanism 30. The first and second connectors 83a and 83b are double swing doors or so-called French doors, as rotationally openable in opposite directions.

Figure 9:
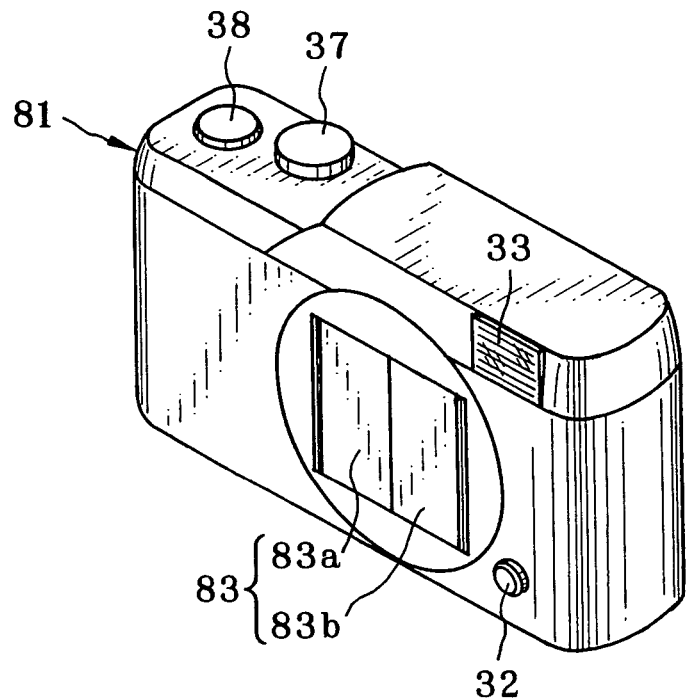
FIG. 9 is a perspective illustrating the connector in the closed state.

First electric contacts or contact group 85 is disposed on the rear of each of the first and second door shaped connectors 83a and 83b. In FIG. 9, the first and second connectors 83a and 83b are closed, to protect the first electric contacts 85 inside. First and second insertion cavities 86a and 86b are formed in the lens barrel 82 for insertion of the first and second connectors 83a and 83b, and are in a similar form to that of the cavity 22 of the above embodiment.

Figure 10:
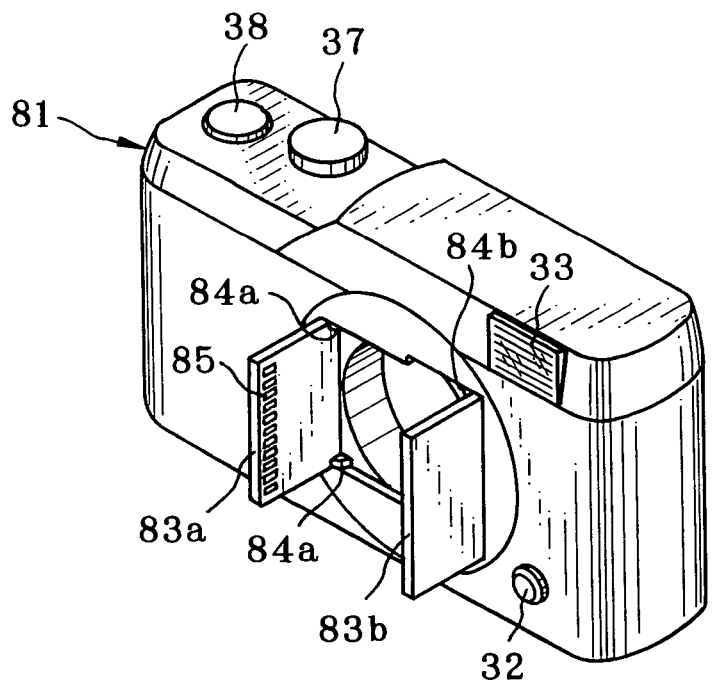
FIG. 10 is a perspective illustrating one preferred embodiment of which two connectors are shaped differently.

In FIG. 10, other preferred shapes of the first and second door shaped connectors 83a and 83b are illustrated. The first connector 83a is smaller than the second connector 83b in the vertical direction. In combination with this, the first cavity 86a is smaller than the second cavity 86b. This structure is effective in preventing an error in insertion of the first and second connectors 83a and 83b in the first and second insertion cavities 86a and 86a, because the second connector 83b cannot enter the first cavity 86a.

Note that the number of the first and second door shaped connectors 83a and 83b may be three or more. The direction of being openable of the first and second connectors 83a and 83b may be changed suitably. It is possible to determine high the number of the contacts by constructing the connector by the plural doors. A fitted state between the camera main unit and the lens barrel can be ensured.

Figure 11:
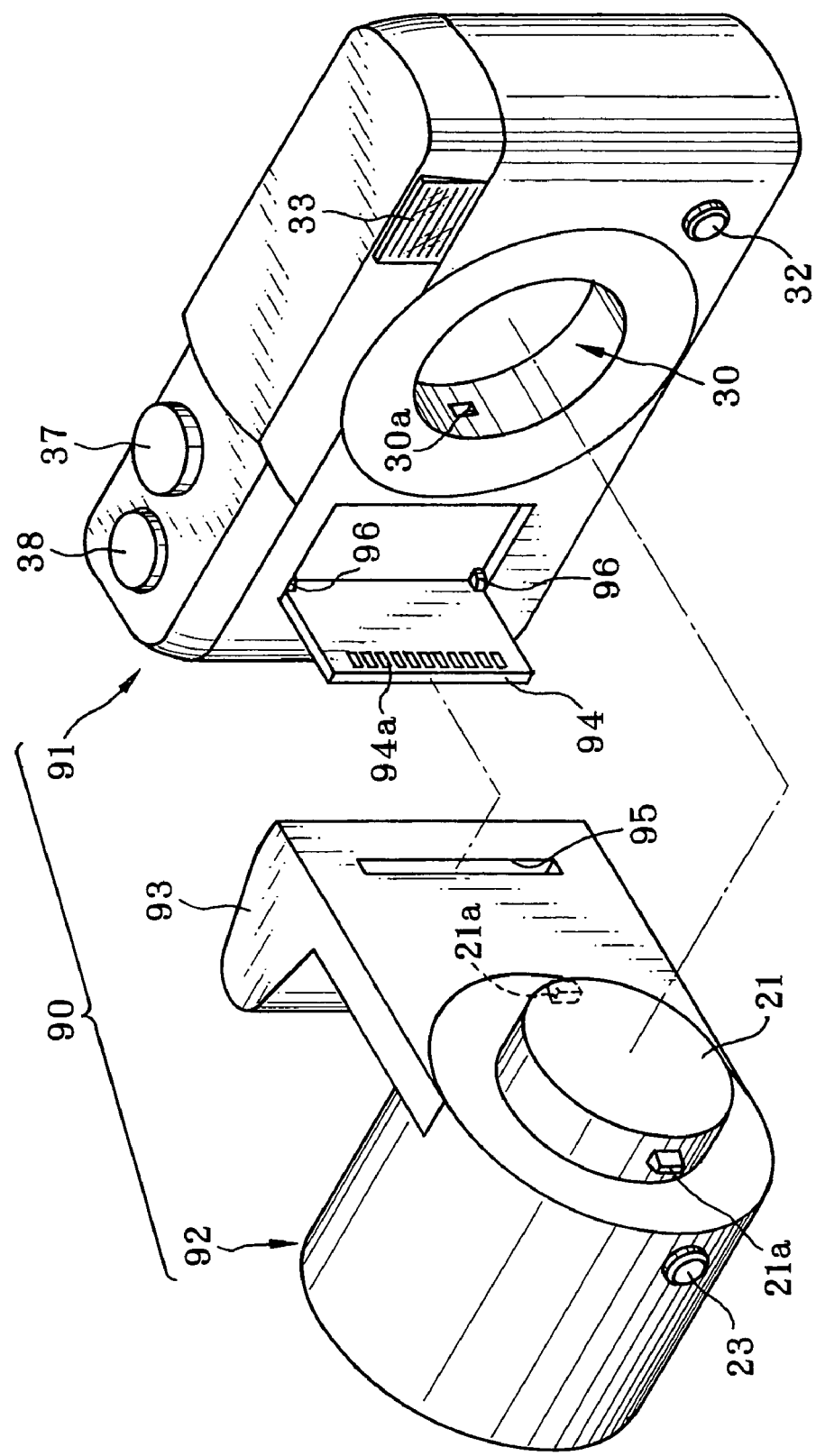
FIG. 11 is a perspective illustrating one preferred lens barrel provided with a grip portion.

In FIG. 11, a digital still camera 90 with another preferred lens barrel 92 is illustrated. A camera body or camera main unit 91 is combined with the lens barrel 92. Elements similar to those of the above embodiments are designated with identical reference numerals.

A grip 93 is formed to project from the lens barrel 92 and positioned in front of the camera main unit 91. A cavity for insertion 95 is formed to open in the rear of the end portion of the grip 93. A connector 94 of a door shape of the camera main unit 91 is insertable in the cavity 95, which is structurally similar to the cavity 22.

A hinge mechanism 96 keeps the connector 94 rotatable on the front surface of the camera main unit 91. First electric contacts or contact group 94a is disposed in the rear of the edge portion of the connector 94. When the connector 94 is closed, the first electric contacts 94a are protected inside.

Figure 12:
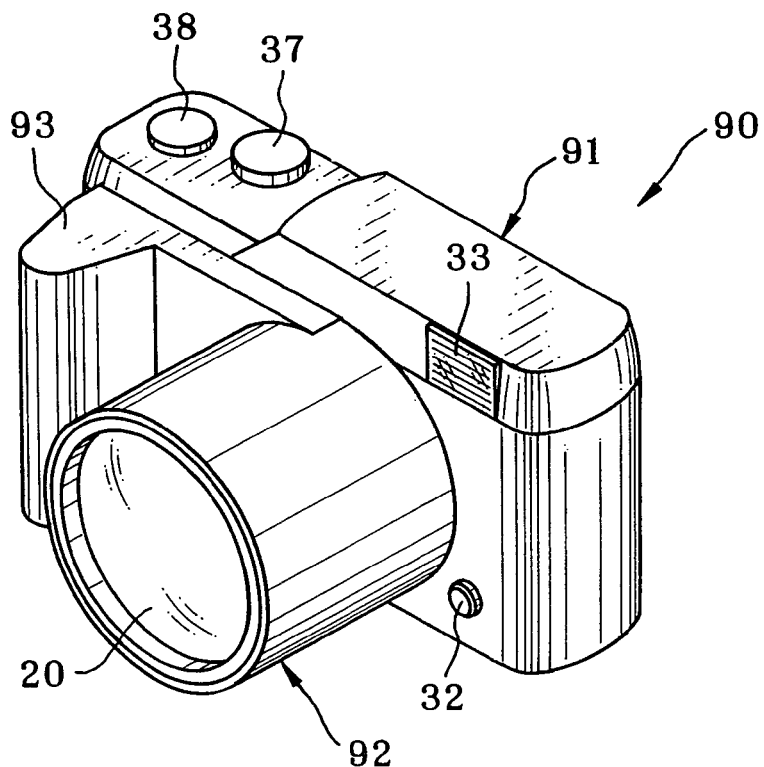
FIG. 12 is a perspective illustrating a camera main unit provided with the lens barrel.

In FIG. 12, the lens barrel 92 is connected with the camera main unit 91. It is possible for a user to hold the digital still camera 90 firmly by grasping the grip 93 of the lens barrel 92 no matter how small the thickness of the camera main unit 91 is. Camera shakes during the photography can be prevented.

The lens barrel 92 according to the invention is preferable specifically for mounting of a telephoto lens having a high magnification. In contrast, the lens barrel 12 of the first embodiment is preferable specifically with a small lens, wide-angle lens, or the like.

Figure 13:
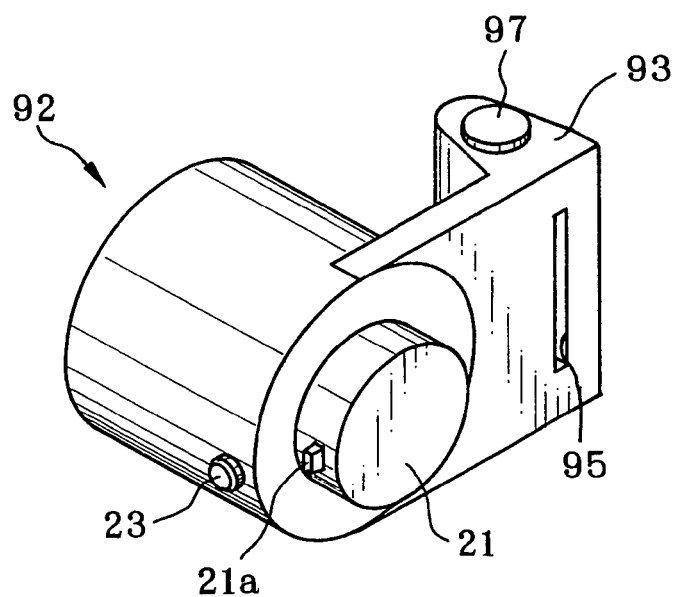
FIG. 13 is a perspective illustrating one preferred lens barrel having a shutter button.
Figure 14:
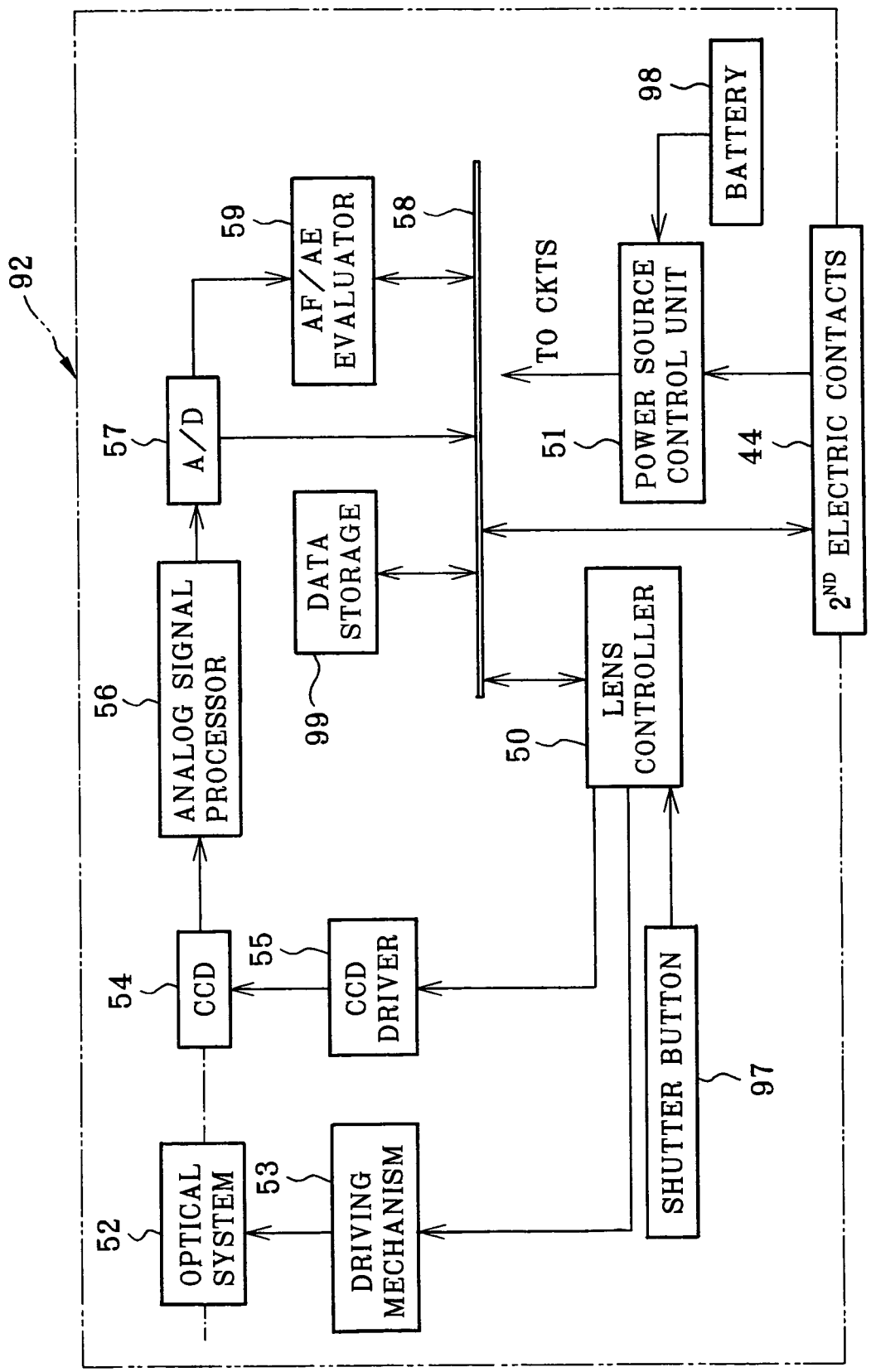
FIG. 14 is a block diagram illustrating the lens barrel of FIG. 13.

In FIG. 13, another preferred example of the lens barrel 92 is illustrated. A shutter button 97 is disposed on an upper end of the grip 93. The shutter button 97 is structurally the same as the shutter button 38 of the camera main unit 91. The construction of the lens barrel 12 is repeated in the lens barrel 92. In addition, a battery 98 and an image data storage or storage medium 99 are contained in the lens barrel 92. See FIG. 14. The battery 98 is connected with the power source control unit 51, which converts the voltage output by the battery 98 into a predetermined voltage, which is supplied to various elements in the lens barrel 92. The image data storage 99 is connected with the data bus 58, and stores image data output by the A/D converter 57.

The shutter button 97 has a switch circuit connected with the lens controller 50. When the switch of the shutter button 97 sends a shutter operation signal to the lens controller 50, the lens barrel 92 is enabled to pick up an image as a single unit. While the lens barrel 92 is used for photography, the camera main unit 91 can be used as a display panel for monitoring for the purpose of displaying image of image data stored in the storage of the lens barrel 92. Also, a memory card can be combined and used with the lens barrel 92 in a removable manner for the purpose of obtaining a higher number of available image frames.

In the above embodiment, the CCD 54 is used. Note that another image pickup element can be used in place of the CCD 54, for example, CMOS image sensor.

In the above embodiment, the image pickup element is incorporated in the lens barrel. However, the image pickup element may be incorporated in the camera main unit. Furthermore, a camera of the invention may be one for use with a silver halide photo film instead of the digital still camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A device for photographing, comprising:
   a camera main unit;
   a lens barrel secured to said camera main unit in a removable manner;
   a first electric contact disposed on said camera main unit;
   a second electric contact, disposed on said lens barrel, for electric contact with said first electric contact upon mounting of said lens barrel on said camera main unit, and for communication between said camera main unit and said lens barrel;
   a connector, disposed in said camera main unit, and coupled with a camera front face in an openable manner, wherein said first electric contact is disposed on a rear surface positioned internally when said connector is closed;
   a cavity, formed in said lens barrel, having said second electric contact, for receiving insertion of said connector opened in a forward direction.

2. A device for photographing as defined in claim 1, further comprising a retaining mechanism for retaining said connector being inserted in said cavity.

3. A device for photographing as defined in claim 2, wherein said camera main body includes a hinge mechanism for keeping said connector rotatable on said camera front surface between open and closed positions.

4. A device for photographing as defined in claim 3, wherein said cavity includes:
   an entrance channel; and
   a lid shiftable between first and second positions, for closing said entrance channel when in said first position, and for being pushed by said connector being inserted, to shift to said second position to open said entrance channel.

5. A device for photographing as defined in claim 4, wherein said camera main unit includes a power switch for switching on and off upon opening and closing of said connector, to supply said lens barrel with power.

6. A device for photographing as defined in claim 4, wherein said retaining mechanism is disposed in an inside of said cavity, and retains an engageable portion of said connector.

7. A device for photographing as defined in claim 6, wherein said camera front surface has a lens mount mechanism where said lens barrel is mounted removably, and said connector is closed and covers said lens mount mechanism when said lens barrel is removed.

8. A device for photographing as defined in claim 7, wherein said first electric contacts are arranged in a zigzag form.

9. A device for photographing as defined in claim 6, wherein said first electric contact is plural contacts arranged in at least one array.

10. A device for photographing as defined in claim 9, wherein said first electric contacts have respectively a sharp corner, and are so disposed that said sharp corner is directed opposite between two arrays.

11. A device for photographing as defined in claim 3, wherein said connector is constituted by at least first and second connectors kept rotatable in directions opposite to one another by said hinge mechanism.

12. A device for photographing as defined in claim 11, wherein said first and second connectors are different in a shape.

13. A device for photographing as defined in claim 12, wherein said first and second connectors are different in a size in a vertical direction.

14. A device for photographing as defined in claim 3, wherein said lens barrel includes a grip portion in which said cavity is formed.

15. A device for photographing as defined in claim 14, wherein said grip portion includes a panel part disposed to project from a barrel peripheral surface, fitted on said camera front surface, and a grip projection for projecting from said panel part in said forward direction.

16. A device for photographing as defined in claim 3, wherein said lens barrel includes an image pickup element for producing image data by photo reception of object light.

17. A device for photographing as defined in claim 16, wherein an external data storage is used with said camera main unit, for storing said image data.

* * * * *